(No Model.) 5 Sheets—Sheet 1.
W. HOCHHAUSEN.
AUTOMATIC SPEED REGULATOR FOR ELECTRIC MOTORS.
No. 516,651. Patented Mar. 20, 1894.

ATTEST:
J. A. Hurdle
Wm H. Capes

INVENTOR:
Wm Hochhausen
By H. C. Townsend,
Attorney

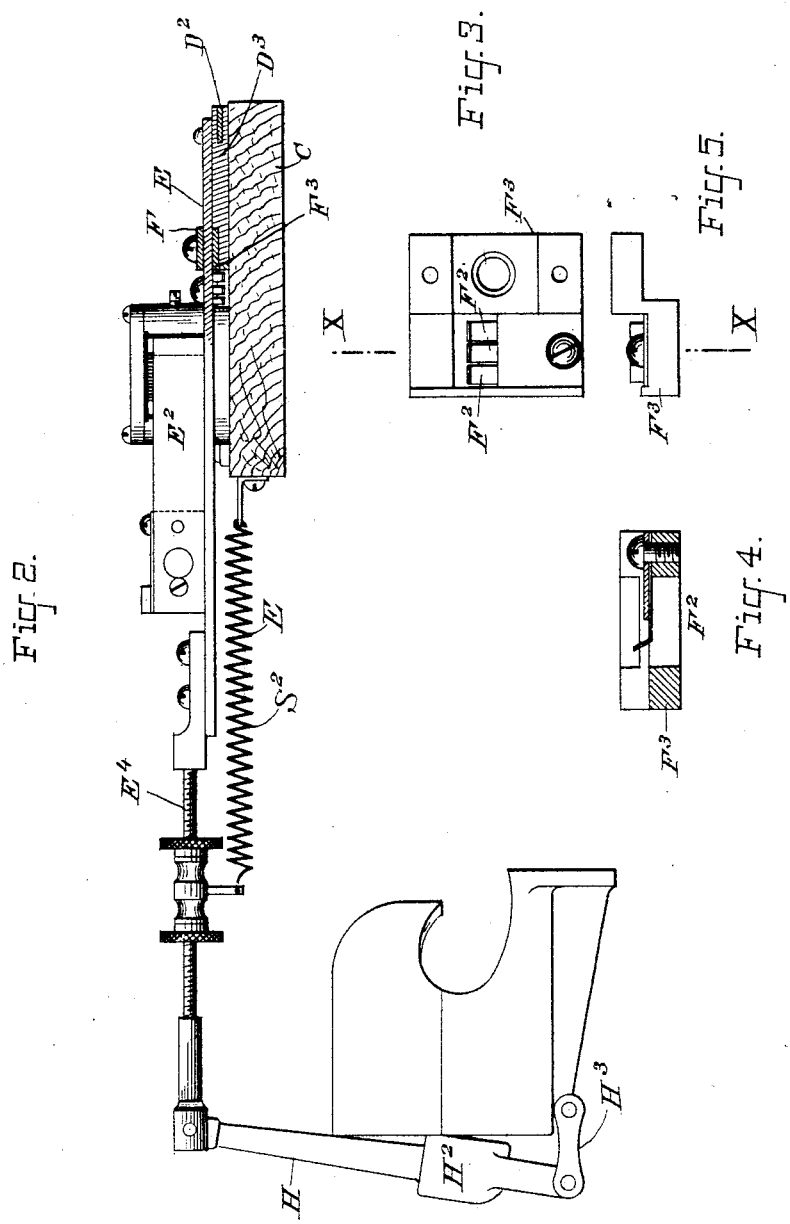

(No Model.) 5 Sheets—Sheet 3.
W. HOCHHAUSEN.
AUTOMATIC SPEED REGULATOR FOR ELECTRIC MOTORS.
No. 516,651. Patented Mar. 20, 1894.
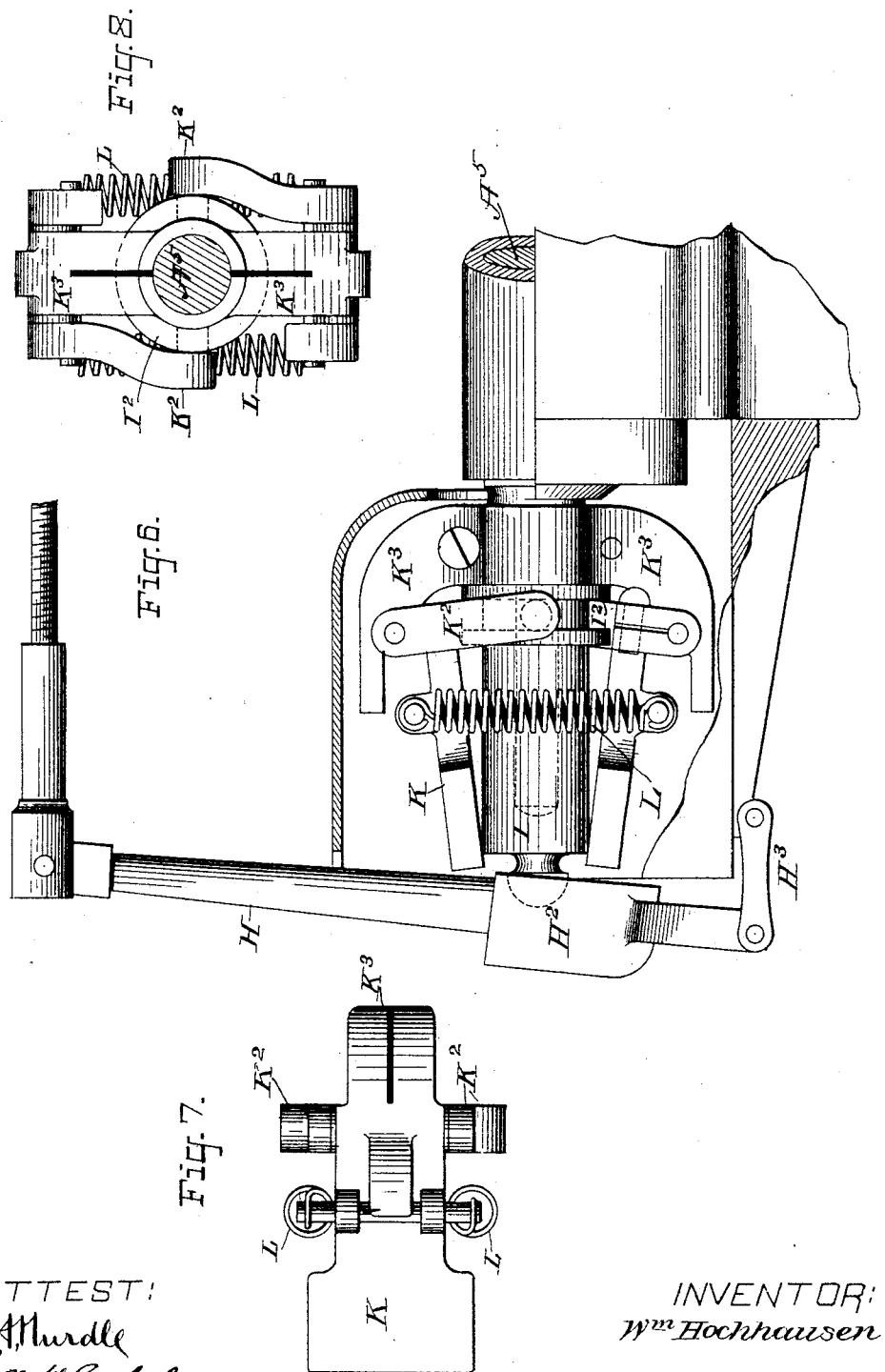
ATTEST:
J. H. Murdle
Wm. H. Capel
INVENTOR:
Wm. Hochhausen
By H. C. Townsend
Attorney (No Model.) W. HOCHHAUSEN. 5 Sheets—Sheet 4.
AUTOMATIC SPEED REGULATOR FOR ELECTRIC MOTORS.
No. 516,651. Patented Mar. 20, 1894.

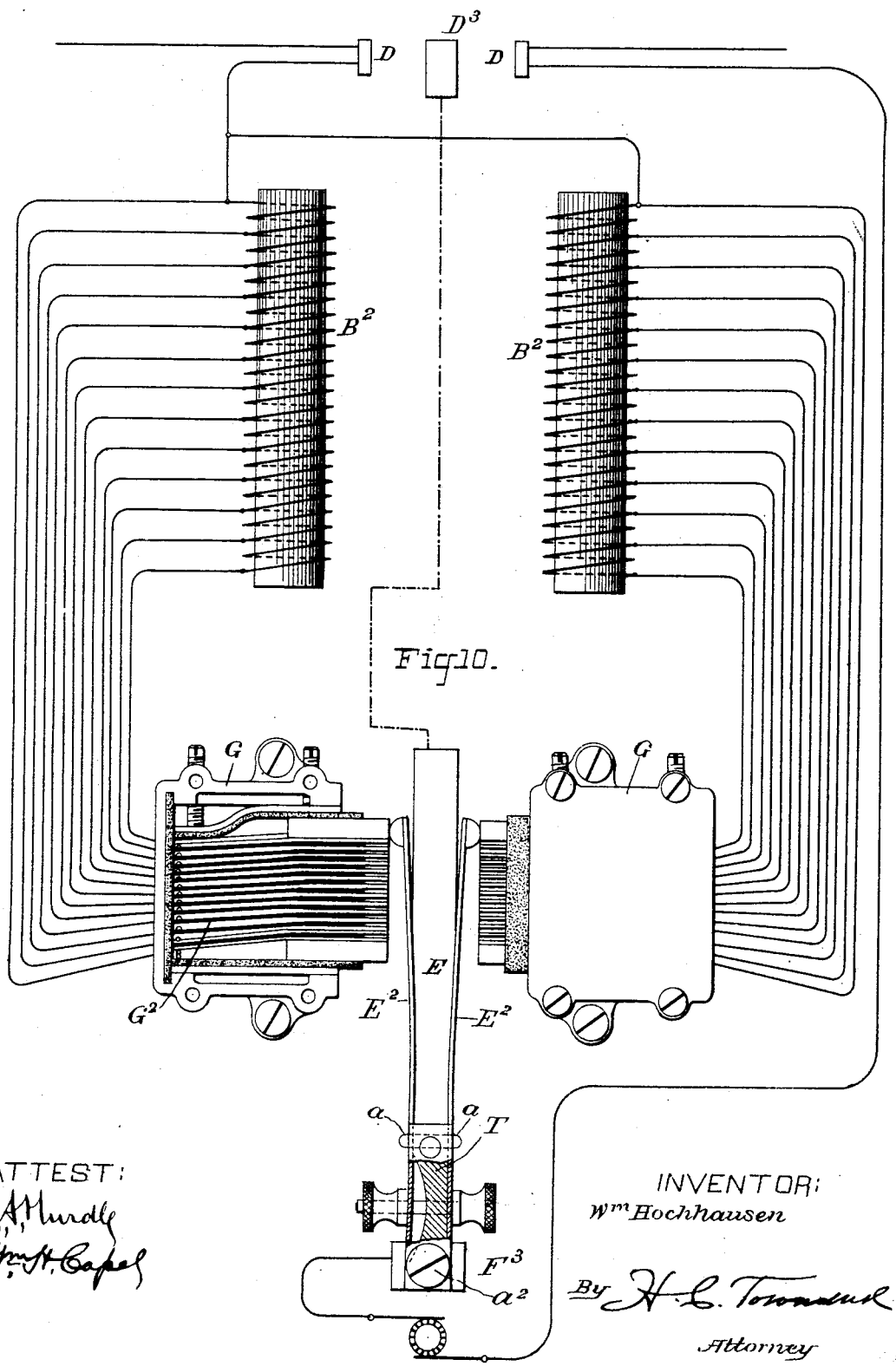

UNITED STATES PATENT OFFICE.

WILLIAM HOCHHAUSEN, OF BROOKLYN, NEW YORK.

AUTOMATIC SPEED-REGULATOR FOR ELECTRIC MOTORS.

SPECIFICATION forming part of Letters Patent No. 516,651, dated March 20, 1894.

Application filed November 26, 1889. Serial No. 331,658. (No model.)

*To all whom it may concern:*

Be it known that I, WILLIAM HOCHHAUSEN, a citizen of the United States, and a resident of Brooklyn, in the county of Kings and State of New York, have invented certain new and useful Automatic Speed-Regulators for Electric Motors, of which the following is a specification.

My invention relates to regulators designed for application to electric motors and operating to change or vary the electric efficiency of the motor on a change of speed so as to tend to keep the speed constant.

My invention is especially useful for electric motors constructed with a field of force magnet having a sectional winding the number of sections of which are varied for the purpose of varying the strength of the field of the motor in accordance with changes of load or increase of speed for the purpose of preventing the motor from racing under light loads.

The object of my invention is to produce a regulator which shall be efficient in operation and simple as well as compact in its organization, and to which end my invention consists in the particular organizations, combinations and details of construction hereinafter described and more particularly specified in the claims.

In carrying out my invention I propose to employ a centrifugal or ball governor device connected with the electric regulating mechanism, such governor device being of a simple and compact construction and having its movable portion connected to the regulator bar as will be hereinafter described.

Figure 1:
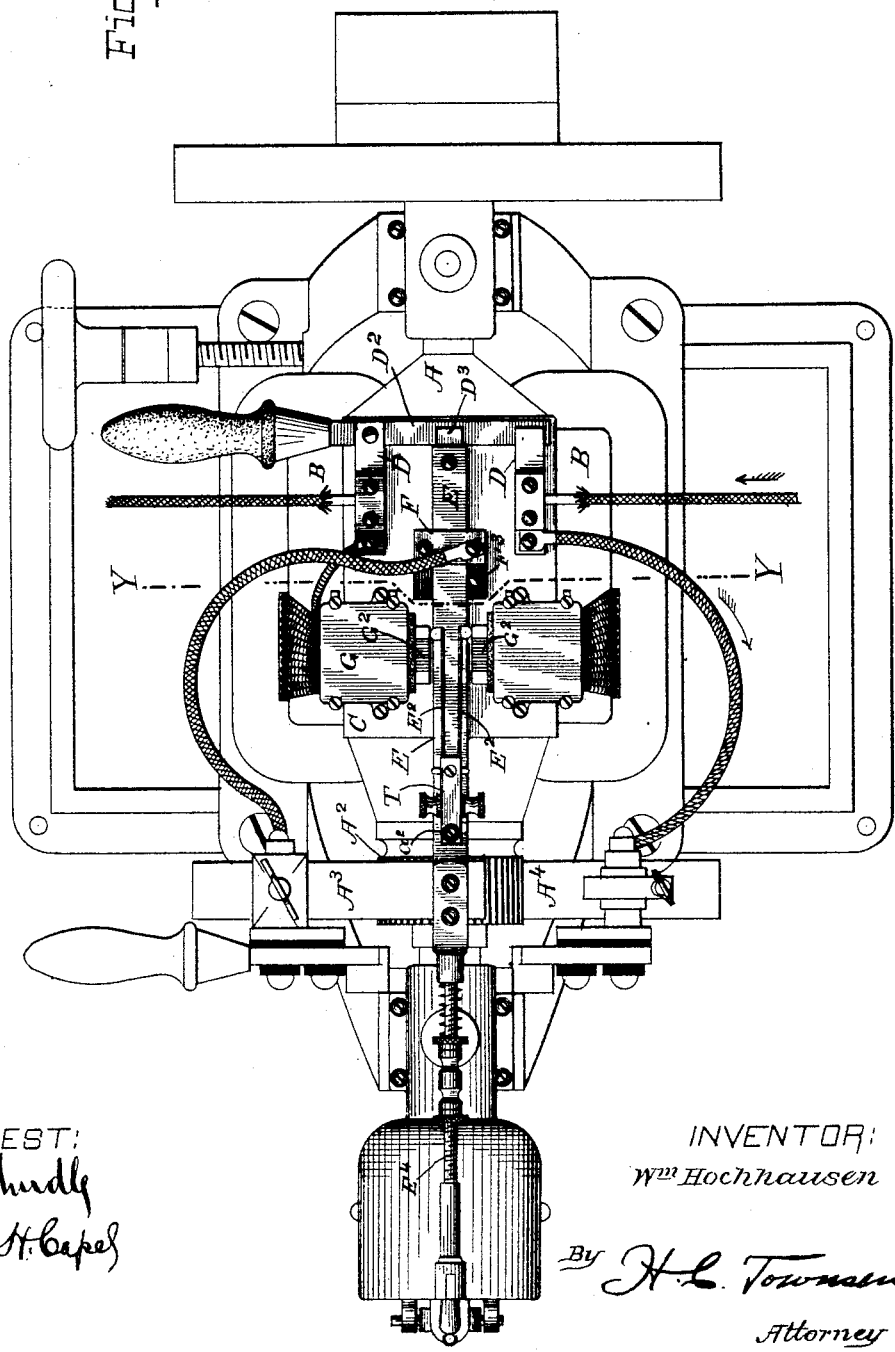
Figure 9:
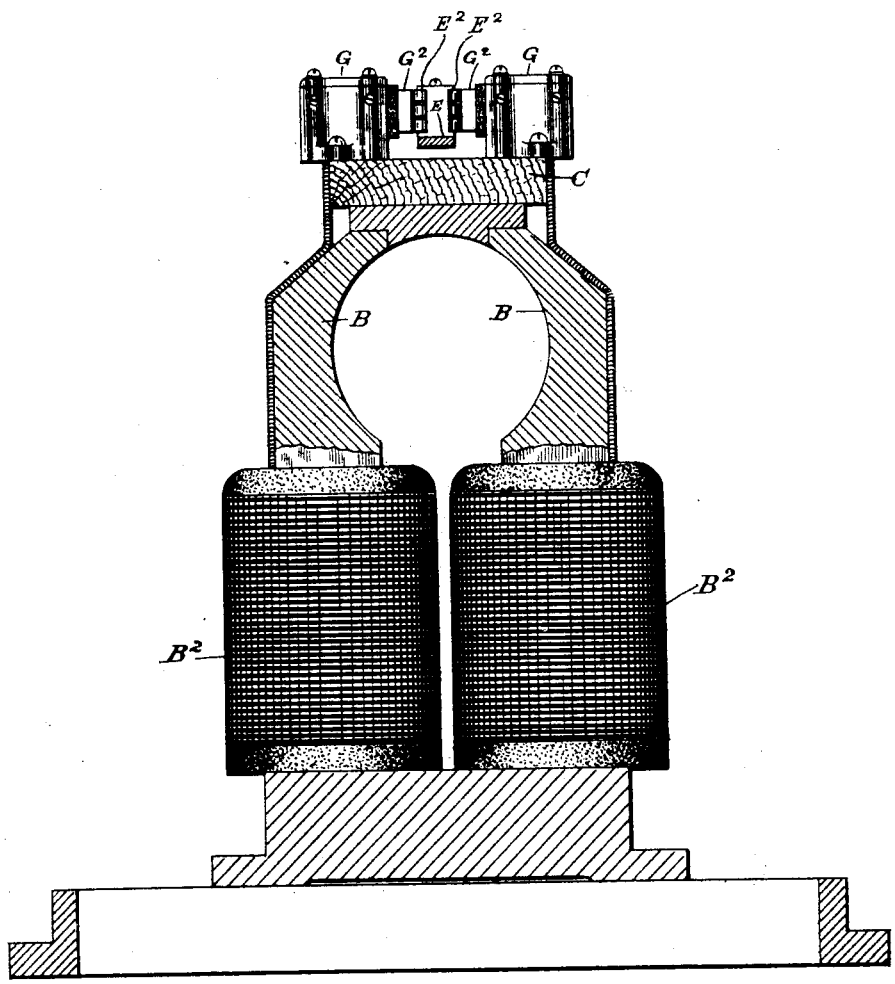

In the accompanying drawings:—Figure 1, is a plan of a motor and regulator embodying my invention. Fig. 2, is a side elevation of the horizontal bar for the electric regulator, such bar being, in the preferred form of my invention, an electric switch bar or rod. Fig. 2, shows also in section some of the parts upon which said bar rides, and also shows the manner of connecting the same with a lever against which a movable head or slide of the centrifugal governor exerts an end thrust. Fig. 3, is a plan of a conducting block on which the switch or regulator bar moves. Fig. 4, is a horizontal section on the line X, X, Figs. 3 and 5, and Fig. 5, is an end elevation of Fig. 3. Fig. 6, is a side elevation of the centrifugal governor mechanism. Fig. 7, is a plan of one of the pivoted governor weights. Fig. 8, is an end view of the governor mechanism looking from the inside, the parts being broken away to show the construction. Fig. 9, is an end elevation of the field magnet of the motor and the parts supported on the pole pieces thereof. Fig. 10, is a diagram of the circuits in the apparatus.

B, B, indicate the poles of the field magnet of the motor and $B^2$, $B^2$, the field magnet coils. As shown more clearly in Fig. 9, the motor field magnet is of the ordinary U shaped form the legs of which project upwardly. The armature A, of the motor revolves between the pole pieces B, B, and is of any usual or desired type being secured to a shaft mounted in proper bearings extending upward from the frame or base of the motor. The commutator indicated at $A^2$, has the usual brushes $A^3$, $A^4$.

C, indicates a plate, preferably of some insulating material, mounted on the top of the field magnet poles.

D, D, are blocks of conducting material serving as clamps respectively for the two line wires, as indicated in plan Fig. 1, while $D^2$, is an electric switch lever pivoted on or in electrical connection with the block D, and adapted to be swung by means of a handle so that its opposite free end may be brought into and out of engagement with a split or spring portion of the opposite block D. An intermediate block $D^3$, split to be engaged by the switch bar $D^2$, is of conducting material and is in electrical connection with the horizontal sliding regulator or switch bar E, which slides on a block $F^3$, secured to the bar $D^3$, and is fastened down by a clamp plate F.

To assist in preserving the electrical connection with the bar $D^3$, or the block $F^3$, secured to such bar, I provide the block $F^3$, with a number of contact springs $F^2$, the ends of which are bent up to engage with the lower side or surface of the bar E. The switch rod or bar E, is provided with contact springs $E^2$, that are adapted to ride over a series of switch contacts or blocks $G^2$, connected to the sections of the field magnet coils. The contact blocks or plates are arranged as shown so that their contact faces shall form the opposite walls or faces of a groove or slot within which the contact springs $E^2$ move. These contact springs press laterally outward toward the walls of the slot being compressed within the slot and provided preferably with means for increasing the spring pressure when for any reason the spring pressure slackens. When the switch bar is in the position shown all of the coils of both legs of the field magnet are in circuit, but as the switch bar is moved to the left the coils are gradually cut out thus weakening the field magnetism. The field magnet coils $B^2$, are wound sectionally, in any desired manner, and their terminals are connected to the switch blocks $G^2$, in a manner clearly indicated in the diagram Fig. 10. One end of the set of field magnet coils is connected to the line contact block D; the other end connects to that one of the contact blocks upon which the spring $E^2$, bears when the motor is at rest. A connection to the same line contact block D, is taken from both coils of both legs of the field magnet as shown in the diagram. A connection with the switch bar or rod E, to one of the commutator brushes is made by a cable or other connection with the block $F^3$, as clearly shown in Fig. 1. The opposite commutator brush connects with the opposite line clamp block D. As will be seen by the diagram the coils of the field magnet legs or branches are in multiple with one another, but in a series connection with the armature.

G, is a box or casing in which the switch contact plates $G^2$, are clamped by means of screws passing through the sides of the box. The several contact blocks or plates are insulated from one another by sheets of insulating material, and insulating material in sheets is likewise placed as a lining to the box. The connections from the sections of the field magnet coil are carried up over the outside of the pole pieces B, and the ends of the connecting wires are bared and clamped in place between the switch contact plates as shown in the diagram.

In order to adjust the tension of the springs $E^2$, I mount them on a head T, pivoted at $a^2$, which is cut away as shown in plan view to permit the use of a compression screw or clamp passing through the head T, and the springs at the reduced or cut away portion. The action of this clamping device would evidently be to cause the free ends of the springs to spread with an increased force, the springs themselves having a bearing at points $a$, on the head T. The cut out switch lever $D^2$, when in the position shown in Fig. 1, obviously shunts the current around the motor. On throwing the switch to disconnect it from both $D^3$ and D, current will pass through the motor and through the magnet coil, When the switch is turned in the opposite direction it will make contact first with $D^3$, thereby first shunting the field magnet coils, after which a continuance of the movement will cause the motor armature to be shunted by contact of the free end of the lever with the line contact block D. By this organization the field magnetism is killed before the armature is shunted or short circuited, and the liability to damage of the armature on shutting down is thereby decreased.

The regulator bar or switch rod E, is operated by a lever H, connected with said rod through a connecting bar $E^4$. The lever H, is pivoted on an equalizing or parallel motion link bar $H^3$, which is pivoted to the pillow block or some portion of the frame of the motor. The lever H, is engaged directly at $H^2$, by a head I, which exerts an end thrust on lever H, and is preferably formed as a sleeve mounted on the end of the armature shaft $A^5$. The end of the head is formed as a ball or sphere and rests in a socket or depression in the lever thus giving a free and easy movement of the parts as the lever swings. End motion is communicated to the head I, by the pivoted governor weights K, each provided with ears by which it is pivoted on a cross bar $K^3$, and with a pin which engages with the head I, by means of a groove formed on the head by flanges $I^2$. The governor weights are connected by a spring L, which opposes their tendency to move upward under centrifugal action. When the speed of the motor rises the governor weights or plates K, being thrown outward impart an end movement or thrust to the head I, which is communicated to the lever H, thereby moving the switch bar E, backward in a direction to cut out the field magnet coils and thereby weaken the field of the motor. The bearing of the head I, in the socket or portion $H^2$, of lever H, is preserved throughout the arc of swing of lever H, by means of the parallel motion link $H^3$, which also operates to cause the end of the lever H, connected to the bar $E^4$, to move in an approximately straight line. The return movement of the switch or regulator bar E, when the speed of the motor lessens is produced by means of the spring $S^2$, as shown in Fig. 2, which spring is provided with any proper means, as indicated, for increasing its tension when desired. I prefer to use for the purpose a pair of adjustable nuts upon the connecting bar $E^4$ which nuts engage with a sliding head which moves as a collar on the bar and is connected to one end of the spring, the other end of the spring being connected to a fixed support as to the plate in which the switch bar slides.

As will be seen my regulator is exceedingly simple and compact and has but few parts exposed to derangement. It will also be seen that the connecting wires from the field magnet sections are short and are exposed but little to danger of displacement as they lie directly upon the poles of the field magnet and are joined directly at the top of said poles with the contact plates or blocks of the switch mounted on the top of the pole.

While I have described the regulator bar as a straight bar E, which slides and, by suitable contact surfaces carried thereby, makes connection with the contact blocks connected to the field magnet coils, I do not wish to be understood as limiting myself to a sliding connecting bar, since it is obvious that the bar might be moved in other ways and movement given thereto by suitable intermediate devices between the electric connector and the head or movable portion of the centrifugal governor. I however, prefer to employ the special construction of sliding bar, contacts carried thereby and switch contact blocks hereinbefore described.

What I claim as my invention is—

1. The combination with an electric motor having a U shaped field magnet the poles of which are uppermost, of two sets of switch contact blocks or plates mounted on said field poles and connected respectively with the sections of the field magnet coils on each leg of the field magnet, and a reciprocatory switch rod or bar having spring contacts working in a groove formed by the contact ends of said switch blocks and mounted to move horizontally in a direction parallel to the armature shaft.

2. The combination with an electric motor, of two sets of switch contact blocks or plates connected in order to the sections of the field magnet coils as described and having their contact ends presented to one another with a space between to form a groove, and a reciprocating bar or switch rod having two spring contacts working in the groove and pressing outwardly against said contact blocks, said switch rod being mounted to move in a direction parallel to the armature shaft, and a ball governor connected to said rod and mounted on the armature shaft.

3. The combination with the two switch springs $E^2$, mounted on a head T, of the two sets of contacts presented to one another with a space between them in which the springs work, a compression device for compressing or forcing the ends of the springs together where they are mounted and spreading the exterior or contact ends thereof against the said contacts, as and for the purpose described.

4. The combination with the motor field magnet having the sectional coils on its two legs arranged in parallel as described, of two sets of switch contact plates or blocks mounted on the field magnet, and an intermediate switch bar having outwardly pressing contact springs working in the groove or space between, and adapted to engage with the said switch contact blocks.

5. The combination with the electric motor, of the regulator bar reciprocating in a line parallel with the armature shaft, the lever H, connected to said bar, an equalizing lever $H^3$, to which the first lever is pivoted and the reciprocating head connected to the centrifugal governor and engaging with the lever H, as and for the purpose described.

6. The combination with the U shaped field magnet, of two switch plate boxes mounted on an insulating plate secured to the field magnet poles, connecting wires clamped in said boxes between the switch contact blocks at the ends thereof next the edge of the insulating plate, said connecting wires leading over the field magnet poles of the field magnet coil, and switch springs working in a slot the walls of which are formed by the contact ends of the switch plates, as and for the purpose described.

7. The combination with the regulating devices for the motor of the actuating lever pivoted on an equalizing lever or link as described, and a sleeve I connected with the centrifugal governor and having its end or head engaging or abutting directly against the said actuating lever.

8. The combination of the armature shaft, the governor weights connected by a spring and pivoted on said shaft, a sleeve I having a groove with which pins carried by the weights engage, and a lever engaged by the head of the sleeve and connected with the motor regulating devices.

9. The combination with the armature shaft of the grooved sleeve I, the cross bar $K^3$, the weights K, each having an ear by which it is pivoted to the cross bar and a pin engaging with a groove in the sleeve, a stationary lever engaged by the head of the sleeve so as to be actuated by the end thrust of the same, and a slide bar connected to the lever and carrying the contacts for the regulating switch.

10. The combination with the switch bar carrying the switch contacts, of the switch blocks connected to the sections of field magnet, the connecting rod, and the spring attached at one end to a fixed support and at the other to a head engaged by nuts upon the connecting rod.

11. The combination with the switch rod or bar E, mounted on a conducting plate, of the underlying springs electrically connected with the plate on which the rod moves and having upturned ends which engage with the said bar.

12. The combination with the line clamp contact block or terminals, of a switch lever pivoted to one of said terminals, an intermediate switch contact adapted to be engaged by said lever, an armature in a connection between said intermediate switch contact and one of the line clamp blocks, and field magnet coils in a connection between said intermediate contact and the line clamp block to which the cut out lever is pivoted.

13. The combination with the reciprocating switch bar in the field magnet circuit, of a conducting bed-plate or bar on which it slides, and a switch lever connected to line and adapted to engage with said bed-plate, as and for the purpose described.

14. The combination with an electric motor, of a switch bar E, mounted parallel to the armature shaft and having a sliding contact bearing upon a series of regulating contacts mounted over the armature of the machine, a pivoted lever H, connected to said bar, a reciprocating head I, borne by the armature shaft and exerting an end thrust on said lever, and centrifugal governor weights pivoted on arms secured to the armature shaft and connected with the head by a pin and groove connection, as and for the purpose described.

15. The combination with an electric motor, of a reciprocating contact slide and a series of contacts therefor mounted over the armature of the machine, an actuating lever connected to said slide, a centrifugal governor having weights K, provided with arms $K^2$, and secured to the armature shaft, a reciprocating head sliding on the end of the shaft and connected with said arms by a pin and groove connection, said head bearing upon and exerting an end thrust on the lever, as and for the purpose described.

16. The combination with the motor regulator switch bar moving over a series of contacts upon a plate connecting the poles of the field magnet, of a centrifugal governor having weights carried by the shaft and connected with a reciprocating head, a pivoted lever connected to said head, and intermediate connections between the lever and the switch regulator, as and for the purpose described.

17. The combination with an electric motor, of a regulator switch, an actuating lever therefor, a centrifugal governor having weights K, provided with arms $K^2$, and a reciprocating head engaged by said arms and exerting an end thrust on said lever.

Signed at New York, in the county of New York and State of New York, this 18th day of November, A. D. 1889.

WILLIAM HOCHHAUSEN.

Witnesses:
WM. H. CAPEL,
THOS. F. CONREY.